3,334,015
ANTIBIOTIC STREPTOGAN AND PROCESS FOR PREPARATION
Henry Schmitz, Syracuse, N.Y., assignor to Bristol-Myers Company, New York, N.Y., a corporation of Delaware
No Drawing. Filed Apr. 7, 1966, Ser. No. 540,860
5 Claims. (Cl. 167—65)

This invention relates to a new and useful substance herein designated streptogan, and to processes for its production. More particularly, this invention relates to processes for its production by fermentation and methods for its recovery and purification. The invention embraces this antibiotic in dilute solutions, as crude concentrates and as purified solids. Streptogan is markedly toxic to many types of neoplastic tissue cells and is particularly useful to inhibit the growth of Sarcoma 180 tumor in mice. Streptogan also has an inhibitory action against the growth of certain microorganisms, e.g. *Bacillus subtilus*, *Bacteroides tumides*, and *Kloeckera brevis*, making it useful in separating and classifying mixtures of microorganisms for biological research and for the removal of such microorganisms from laboratory equipment and medical and dental instruments.

There is provided according to the present invention the process for the production of an antibiotic, designated streptogan, also known as antibiotic NSC B26,697, which comprises cultivating a streptogan-producing strain of *Streptomyces streptoganensis*, e.g., A.T.C.C. No. 15421, in an aqueous carbohydrate solution containing a nitrogenous nutrient under submerged aerobic conditions until substantial activity against Sarcoma 180 is imparted to said solution, and, then if desired, recovering said streptogan from said solution. There is further included within the scope of the present invention the streptogan so produced.

The microorganism producing the antibiotic streptogan of the present invention was isolated from a sample of soil collected in Brazil, South America, and is a new species of the genus Streptomyces and has been designated *Streptomyces streptoganensis*. A culture of the living organism, given the laboratory designation *Streptomyces* sp. strain C–6031, has been deposited in the American Type Culture Collection, Rockville, Md., and added to its permanent collection of microorganisms as A.T.C.C. 15421.

The following cultural and morphological characteristics were noted for *Streptomyces streptoganensis*, A.T.C.C. 15421, after 14 days' growth at 28° C. on Glucose Yeast Extract Agar (glucose 4.0 gm., yeast extract 4.0 gm., malt extract 10.0 gm., agar 20.0 gm., distilled water 1000 ml.).

Fully capitalized color names used in culture descriptions correspond to those in A Dictionary of Color and refer to specific color chips. (See Maerz, A. and M. R. Paul, A Dictionary of Color, Ed. II, McGraw-Hill Book Co., Inc., 1950.) The ISCC-NBS common color name for each color chip is given in parenthesis. (See Kelly, K. L., and D. B. Judd, The ISCC-NBS Method of Designating Colors and A Dictionary of Color Names, U.S. Department of Commerce, National Bureau of Standards, Circular 553, Washington, D.C., 1955.) Vegetative mycelium color was determined after removal of existing aerial growth.

COLONIAL MORPHOLOGY AND CULTURAL CHARACTERISTICS

Typical isolated colonies: Circular, pulvinate, 3–5 mm. in diameter.
Vegetative growth: Moderate, appressed, dark reddish brown to purplish black, visible only after removal of the aerial growth.
Aerial growth: Profuse, powdery, LOG CABIN P1 15A–5 (brownish gray #64).
Colony reverse: Brownish black.
Soluble pigment: Dark reddish brown, diffusion limited.

MICROSCOPIC MORPHOLOGY

Vegetative mycelium: Typical, no evidence of fragmentation.
Aerial mycelium: Monopodially branched ca. 0.5μ wide.
Sporophore: Monopodially branched, terminating in chains of spores arranged in open spirals of up to 10 turns.
Conidia: Catenulate, elongated ovoid, ca. 0.7 x 1.0–1.4μ, surface smooth but somewhat irregular.

*Streptomyces streptoganesis* exhibits the following cultural characteristics when grown in a crosshatch pattern on the indicated nutrient media for 14 days at 28° C.

MEDIUM NO. 1 TOMATO PASTE OATMEAL AGAR

Vegetative: Moderate, appressed, purplish black.
Aerial: Profuse, powdery, GOAT P1 15C–5 (brownish gray #64).
Reverse: Purplish brown to black.
Soluble Pigment: Reddish brown, diffusion limited.
Remarks: Melanin-negative, sporophore monopodially branched terminating in regular spirals of 3–8 turns.

MEDIUM NO. 2 BENNETT'S AGAR

Vegetative: Moderate, appressed, dark reddish brown to purplish brown.
Aerial: Profuse, powdery, LOG CABIN P1 15A–5 (brownish gray #64).
Reverse: Brownish black.
Soluble Pigment: Reddish brown, diffusion limited.
Remarks: Melanin-negative.

MEDIUM NO. 3 NUTRIENT AGAR

Vegetative: Moderate, appressed, dark brown.
Aerial: Abundant, powdery, ORMOND P1 14A–4 (light grayish reddish brown #45, light grayish brown #60, or light brownish gray #63).
Reverse: Brownish black.
Soluble Pigment: Greenish brown, diffusion limited.
Remarks: Melanin-negative.

MEDIUM NO. 4 TRYPTONE GLUCOSE AGAR

Appearance similar to that on Nutrient Agar except that near the end of the 14-day incubation period extensive overgrowth of off-white aerial mycelium develops over most of the sporulating surface.

MEDIUM NO. 5 INORGANIC SALTS STARCH AGAR

Vegetative: Fair to moderate, appressed, grayish tan to dark brownish black.
Aerial: Profuse, powdery MAUVE TAUPE P1 7C–8 (dark reddish gray #23).
Reverse: Dark brown.
Soluble Pigment: Light brown to light reddish brown, diffusion limited.
Remarks: Starch hydrolyzed, spiral spore chains observed.

MEDIUM NO. 6 GLYCEROL CALCIUM MALATE AGAR

Vegetative: Poor, appressed, pale greenish tan.
Aerial: Moderate, powdery, SAND P1 13B–2 (light grayish) olive #109 or light olive gray #112).
Reverse: Light grayish olive.

Soluble Pigment: None to very faint tan.
Remarks: Slight clearing of the medium.

MEDIUM NO. 7 SUCROSE NITRATE AGAR

Vegetative: Poor, appressed, light greenish tan.
Aerial: Abundant, powdery, in concentric bands, LOG CABIN P1 15A–5 (brownish gray #64).
Reverse: Light gray.
Soluble Pigment: None.

MEDIUM NO. 8 GLYCEROL NITRATE AGAR

Vegetative: Very scant, appressed, colorless to pale tan.
Aerial: Moderate, powdery, CUBAN SAND, P1 13A–3 (light grayish yellowish brown #79).
Reverse: Cream to light gray.
Soluble Pigment: None.
Remarks: Sporophore monopodially branched, regular to irregular spiral spore chains of up to 10 turns.

MEDIUM NO. 9 GLUCOSE ASPARAGINE AGAR

Vegetative: Poor, appressed, greenish white to greenish tan.
Aerial: Abundant, powdery, SANDY BEIGE P1 14A–3 (light brownish gray #63) to NUTRIA P1 15A–3 (olive gray #113).
Reverse: METALLIC GREEN P1 15L–6 (moderate olive #107).
Soluble Pigment: Light greenish yellow.
Remarks: Sporophore monopodially branched, regular to irregular spiral spore chains of up to 15 turns.

The results obtained in a series of miscellaneous physiological tests are presented in Tables I and II.

TABLE I

| Medium | Remarks |
| --- | --- |
| Peptone Iron Agar and Yeast Extract. | No darkening of medium (melanin negative). |
| Tryptone Yeast Extract Broth. | No soluble pigment after 4 days melanin negative). |
| Tryptose Blood Agar | Positive hemolysis at 3 days, no soluble pigment. |
| Organic Nitrate Broth | No reduction of nitrite after 21 days. |
| Synthetic Nitrate Broth | Reduction to nitrite variable. |
| Starch Ammonium Agar | Positive hydrolysis of starch. |
| Nutrient Agar and 0.4% Gelatin (plate method). | Complete hydrolysis of gelatin at 14 days, reddish brown to brownish black soluble pigment with limited diffusion. |
| Tyrosine Agar | Limited clearing of crystals at 14 days. |
| Xanthine Agar | Crystals unchanged at 14 days. |
| Hypoxanthine Agar | Limited clearing of crystals at 14 days. |
| Casein Agar | Moderate clearing of medium at 14 days. |
| Purple Milk | Gray to dark brownish black vegetative ring; gray sporulation; complete peptonization; no coagulation; pH 8.0 at 21 days. |

TABLE II.—ASSIMILATION OF CARBON COMPOUNDS IN A SYNTHETIC MEDIUM [1]

| | |
| --- | --- |
| Xylose (+) | Dulcitol (−) |
| Arabinose + to (+) | Mannitol + |
| Rhamnose + | Sorbitol − |
| Galactose + | Inositol (−) |
| Glucose + | Glycerol (−) |
| Maltose + | Salicin + to (+) |
| Fructose + | Na Acetate (+) |
| Sucrose − | Na Citrate (+) |
| Lactose (−) | Na Oxalate − |
| Cellobiose (+) | Na Salicylate − |
| Raffinose − | Na Tartrate − |
| Starch (soluble) + | Na Succinate (+) to (−) |
| Dextrin + | Ca Malate (+) |
| Inulin − | Control − |

[1] Pridham, T. G. and Gottlieb, D., "Assimilation of Carbon Compounds in Synthetic Medium", J. Bacteriol. 56: 107–114 (1948).
+ Abundant growth (definite utilization).
(+) Moderate growth (probable utilization).
(−) Very slight growth (no utilization).
− No growth.

*Streptomyces streptoganensis*, when grown under suitable conditions, produces streptogan. A fermentation broth containing streptogan is prepared by inoculating spores or mycelia of the streptogan-producing organism into a suitable medium and then cultivating under aerobic conditions. For the production of streptogan, cultivation on a solid medium is possible, but for production in large quantity, cultivation in a liquid medium is preferable. The temperature of the cultivation may be varied over a wide range, 20–35° C., within which the organism may grow, but a temperature of 25–30° C. and a neutral pH, i.e., 6.0–8.0, are preferred. In the submerged aerobic fermentation of the organism for the production of streptogan, the medium contains as the source of carbon, a commercially available glyceride oil or a carbohydrate such as glycerol, glucose, maltose, sucrose, lactose, dextrin, starch, etc., in pure or crude states and as the source of nitrogen, an organic material such as soybean meal, distillers' solubles, peanut meal, cottonseed meal, meat extract, peptone, fish meal, yeast extract, corn-steep liquor, etc., and when desired, inorganic sources of nitrogen such as nitrates and ammonium salts, and mineral salts such as sodium chloride, potassium chloride, zinc sulfate and magnesium sulfate, and buffering agents such as calcium carbonate or phosphates and trace amounts of heavy metal salts; such medium ingredients include those listed in Canadian Patent 513,324 and in British Patents 730,341 and 736,325 and in United States Patents 2,691,618, 2,658,018, 2,653,899, 2,586,762, 2,516,080, 2,483,892, 2,609,329 and 2,709,672. In aerated submerged culture, an antifoam such as liquid paraffin, fatty oils or silicone is used. More than one kind of carbon source, nitrogen source or antifoam may be used for the production of streptogan. Generally, the cultivation is continued until at least several hundred mcg./ml. of streptogan is accumulated in the medium. The active substance is contained mainly in the fermentation liquor.

The mycelia are separated from the fermentation liquor and the active principle, streptogan, is precipitated by acetone or ammonium sulfate. Streptogan may also be separated by adsorbtion on diatomaceous earth followed by elution with aqueous sodium chloride. The crude streptogan is purified by the use of gel filtering agents, e.g., Sephadex G-25, G-50, G-75, G-100, G-200, as more fully described in the examples. These are commercially available cross-linked dextran polymers which form gels with water and act as molecular sieves, said to absorb polyglucose molecules below 3,000, 7,000, 10,000, 100,000 and 200,000 molecular weight respectively. They are marketed by Pharmacia Uppsala, Sweden.

The following examples will serve to illustrate the invention described herein without unduly restricting it.

*Example 1*

Media (1, 2) were dispensed in 100 ml. amounts in 500 ml. Erlenmeyer flasks and autoclaved 45 minutes at 18 p.s.i. Forty-eight-hour vegetative growth of *Streptomyces streptoganensis*, A.T.C.C. 15421, in medium (1) was used as inoculum at rate of 2%. Fermentations were performed in medium (2) at 27° C. on a rotary shaker for 72 hours. The shake-flask fermented broth exhibited substantial activity against Sarcoma 180 after 72 hours.

(1) Inoculum medium: Percent
    Glucose _____ 2.0
    $(NH_4)_2SO_4$ _____ 0.3
    $ZnSO_4 \cdot 7H_2O$ _____ 0.003
    Cornsteep (v./v.) _____ 1
    Pharmamedia _____ 1
    $CaCO_3$ _____ 0.4

(2) Production medium:
    Glucose _____ 3
    Soybean meal _____ 3
    NaCl _____ 0.5
    $CaCO_3$ _____ 0.3

*Example 2*

*Production.*—Inoculum (10 gal.) was prepared by growing a vegetative suspension of *Streptomyces strep-*

*toganensis*, A.T.C.C. 15421, in flasks on a rotary shaker for 72 hours at 28° C. The medium employed consisted of corn starch (5%), soybean meal (2%) and $CaCO_3$ (0.1%). A production medium (40 gal.) consisting of glucose (3%), soybean meal (3%), NaCl (0.05%), and $CaCO_3$ (0.03%) was seeded with 1.7% of inoculum and fermented for 100 hours at 28° C. in a 1000-gallon tank fermenter with an air flow of 70 cu. ft./min.

*Isolation.*—The broth (2000 l.) at pH 7–8 was mixed with Dicalite (diatomaceous earth) (70 kg.) and filtered. The filtrate was concentrated in vacuo to 400 l. and mixed with 4 volumes of acetone. The precipitate formed was dissolved in deionized water (584 l.), and the solution was concentrated in vacuo to 130 l. and filtered. The filtrate was passed through a column of Sephadex G–25 (25× 80 cm.) and three fractions collected between the appearance of a positive Molisch test and the rapid rise of conductivity due to the break-through of salts. Sephadex G–25 is a commercially available, cross-linked dextran polymer which forms a gel with water and acts as a molecular sieve absorbing molecules smaller than about 3,000 molecular weight. The three fractions were concentrated to about 2.7 l. and freeze-dried. The yields were 400 gm. of active material active vs. Sarcoma 180 at 2 mkd., 420 gm. active at 4 mkd., and 323 gm. active at 4–8 mkd.

*Purification.*—An aqueous solution of the crude streptogan (250 mg.) was passed through a column of Sephadex G–100 (4.5× 30 cm.). The fractions collected, yields of streptogan and activity against Sarcoma 180 were as follows:

TABLE I

| Ml. Eluate | Yield, mg. | Activity vs. S-180 (as T/C Ratio)[1] | | |
|---|---|---|---|---|
| | | 1 mkd.[2] | 0.5 mkd.[2] | 0.25 mkd.[2] |
| 196–225 | 9 | Toxic | .69 | .65 |
| 226–271 | 27 | .48 | .65 | .74 |
| 272–317 | 50 | .43 | .57 | .55 |
| 318–363 | 31.5 | .08 | .37 | .47 |
| 364–394 | 10 | .52 | .60 | .52 |
| 395–425 | 11.5 | .46 | | |

[1] Average diameter of tumors of treated animals compared to that of controls.
[2] Milligrams streptogan solids per kilogram of mouse per day.

The material from the peak fraction contained 38.7% protein and 24.4% carbohydrate.

Passage of an aqueous solution of crude streptogan (250 mg.) through a column of Sephadex G–200 gave the following:

TABLE II

| Ml. Eluate | Yield, mg. | Activity vs. S-180 (as T/C Ratio)[1] | | |
|---|---|---|---|---|
| | | 1 mkd.[2] | 0.5 mkd.[2] | 0.25 mkd.[2] |
| 165–210 | 4 | .56 | | .80 |
| 211–271 | 30.5 | .10 | .55 | .67 |
| 272–332 | 39 | Toxic | .25 | .54 |
| 333–378 | 22.5 | Toxic | | |

The material from the peak fraction contained 34.3% protein and 18.7% carbohydrate.

*Physical and chemical properties.*—A sample of streptogan prepared by chromatography on Sephadex, with a T/C (S–180) of 0.62, 0.64, and 0.69 at 8, 4 and 2 mkd., gave the following analyses: C=40.2%; H=6.29%; N=2.35%; ash=1.68%; and O (by difference)=49.48%. The specific rotation was $[\alpha]_D^{25}+15°$ (c.=1, $H_2O$). The ultraviolet absorption spectrum of an aqueous solution of streptogan showed a weak peak at 260–280 m$\mu$. The infrared absorption spectrum of streptogan pelleted in potassium bromide exhibited absorption maxima at the following wave lengths in cm.$^{-1}$: 3400, 2940, 1650, 1400, 1000, and 900. Streptogan is readily soluble in water and is substantially insoluble in organic solvents.

On hydrolysis the following sugars were observed after paper chromatography: glucose, galactose, arabinose, xylose, rhamnose and galactosamine.

Streptogan was not degraded by trypsin, carboxypeptidase, peptidase or papain. It was inactivated in aqueous solution at pH 3 and 9, and on boiling at pH 7.

*Preparation of protein and carbohydrate fractions.*—Streptogan (5 gm.) (12 mkd.—T/C=.59) was dissolved in water (250 ml.) and added 50% trichloroacetic acid (250 ml.). After dialysis of the precipitate and the supernate and freeze-drying, the yields were 65 mg. and 3.0 gm., respectively. The solids were inactive against S–180. Repeated attempts to prepare an active peptide moiety failed, in contrast to actinogan which gives a highly active peptide fraction.

An aqueous solution of streptogan was passed through a sulfoethyl cellulose ("Cellex S.E.," a product of Bio-Rad Laboratories, Richmond, Calif., a cation exchange cellulose having sulfoethyl exchange groups on a highly purified cellulose powder) column. Two fractions were eluted, one with water which was inactive against S–180; the other eluted with phosphate buffer pH 7.9 (232 mg.) gave T/C: 8 mkd.—.25; 4 mkd.—.47; 2 mkd.—.61 and 0.5 mkd.—.84. This material contained 44% protein and 3.8% carbohydrate. Paper strip chromatography in a system containing 65% of .02 N HCl and 35% ethanol indicated an $R_f$ of .71 for the sulfoethyl cellulose-treated material.

A sample of the material obtained by passage of an aqueous solution of streptogan through a sulfoethyl cellulose column followed by elution with phosphate buffer as described above, giving T/C (S–180) of .58, .60, and .68 at 1, 0.5, and 0.25 mkd. had 5.64% N. The specific optical rotation was $[\alpha]_D^{25}$ —11.3° (c.=1, $H_2O$). The infrared absorption spectrum was similar to that of streptogan. Amino acid analysis on resin columns indicated the presence of the following:

| | |
|---|---|
| aspartic acid | iso-leucine |
| serine | phenyl alanine |
| glutamine | ornithine |
| proline | lysine |
| glycine | histidine |
| alanine | |

The presence of these 11 amino acids was confirmed by thin-layer chromatography experiments.

*Electrophoresis.*—Streptogan appeared uncharged on continuous current electrophoresis in a pyridine-acetic acid system at 600 v. (90 milliamps); some cationic, inactive material was isolated in 10% yield.

The protein-enriched preparation obtained in 2.9% (w./w.) yield by chromatography on sulfoethyl cellulose was differentiated from peptinogan by lower electrophoretic mobility. Mixtures of the two preparations separated on paper strips, using 0.2 M phosphate buffers, pH 8.7, 350 v. and 15 milliamps. The zones were detected with hypochlorite-starch iodide and ninhydrin sprays.

*Biological properties.*—The antitumor spectrum of streptogan at 16 mkd. is as follows:

ANTITUMOR SPECTRUM

Tumors:                      Inhibition
    Ascitic Sarcoma 180 _____ Complete
    Ascitic Ehrlich Carcinoma _____ Complete
    Crabb Hamster Sarcoma, percent _____ 75
    Friend Virus Leukemia, percent _____ >50
    Solid Friend Virus Lukemia, percent _____ 25–49
    Harding-Passey Melanoma, percent _____ 25–49
    Miyono Adenocarcinoma, percent _____ 25–49

It was inactive against Ridgway Osteogenic Sarcoma, Jensen Rat Sarcoma, Mecea Lymphosarcoma, Ehrlich Carcinoma, Lewis Lung Carcinoma, Fortner Pancreas Adenocarcinoma, and Walker Carcinoma 256.

Streptogan has been found to have antitumor activity against Sarcoma 180 in mice. Daily injections of streptogan resulted in significant inhibition of the growth of this tumor. Streptogan was administered by the intraperitoneal route for five consecutive days at the indicated dosage. Treatment was started one day after a fragment of the tumor had been implanted subcutaneously. One day past treatment, the animals were sacrificed, the tumors excised, and weighed. The test data are summarized in Table III.

TABLE III.—EFFECT OF STREPTOGAN AND SULFOETHYL CELLULOSE TREATED STREPTOGAN ON THE TRANSPLANTED SARCOMA 180 TUMOR IN MICE

|  | Mkd. | Wt. Loss | T/C* | Survivors |
|---|---|---|---|---|
| (A) Streptogan | 32 | −3.1/+0.4 | .50 | 5/5 |
|  | 16 | −2.1/+0.4 | .62 | 5/5 |
|  | 8 | −2.2/+0.4 | .60 | 5/5 |
|  | 4 | −0.4/+0.4 | .71 | 5/5 |
|  | 63 | −3.8/−0.3 | .22 | 4/5 |
|  | 32 | −2.2/−0.3 | .60 | 5/5 |
|  | 16 | −2.3/−0.3 | .64 | 5/5 |
|  | 8 | −0.3/−0.3 | .63 | 5/5 |
|  | 4 | +0.3/−0.3 | .77 | 5/5 |
|  | 2 | +0.1/−0.3 | .81 | 5/5 |
| (B) Sulfoethyl Cellulose treated Streptogan. | 2 | −5.6/+0.5 | .57 | 4/5 |
|  | 1 | −4.2/+0.5 | .60 | 5/5 |
|  | 0.5 | −1.2/+0.5 | .52 | 5/5 |
|  | 4 | −4.1/+0.9 | 0 | 3/5 |
|  | 3 | −4.8/+0.9 | .09 | 3/5 |
|  | 2 | −3.5/+0.9 | .28 | 5/5 |
|  | 1 | −2.0/+0.9 | .32 | 5/5 |
|  | 0.75 | −3.0/+0.9 | .50 | 5/5 |
|  | 0.5 | −0.3/+0.9 | .56 | 4/5 |
|  | 0.3 | −0.4/+0.9 | .61 | 5/5 |
|  | 0.2 | 0/+0.9 | .67 | 4/5 |
|  | 0.4 | −1.9/−0.1 | .59 | 5/5 |
|  | 0.2 | −1.5/−0.1 | .67 | 5/5 |
|  | 0.1 | −1.2/−0.1 | .69 | 5/5 |
|  | 0.05 | −0.9/−0.1 | .66 | 5/5 |

*Since average tumor diameters were utilized to determine "effect," values of 0.75 or less are considered to indicate significant tumor inhibition.

Streptogan (active at 1–16 mkd. vs. S–180) gave an acute toxicity ($LD_{50}$) in female HA/ICR mice of 600 mg./kg. (intraperitoneally). All deaths occurred within 48 hours of injection.

A preparation from sulfoethyl cellulose, active at 0.1–4 mkd., had an $LD_{50}$ of 56 under the same conditions.

Streptogan has demonstrated marked cytotoxicity for HeLa cells, human epidermoid carcinoma of cervix, in tissue culture studies. HeLa cells were inhibited by 60 γ/ml. of streptogan.

Streptogan was found to inhibit *Bacillus subtilus*, *Bactizes tumidus* and *Kloeckera brevis* at concentrations of 100 μg./ml. or less.

*Example 3*

Broth prepared as above was filtered, the clear broth thus obtained was treated with Dicalite (50 gm./l.) and the Dicalite eluted with 4% aqueous sodium chloride (2 ml./gm.). The eluate was de-salted with Sephadex G–25 and freeze-dried. Yield: steptogan, 380 mg./l. of broth.

Another portion of filtered broth was saturated with ammonium sulfate causing precipitation of streptogan. This treatment yielded streptogan in the amount of 1.5 gm./l. of broth.

Streptogan stimulates the host defense mechanism and stimulates antibody production. Thus when a "weak" antigen is given to produce antibodies, the administration of streptogan leads to the production of more antibodies. This is of value in assisting a searcr for a weak but non-toxic antibiotic. Streptogan is a useful tool for the study of factors involved in host resistance, antibody formation, the removal of particles from the blood stream by the reticuloendothelial system and the relation of the reticuloendothelial system to overcoming infections. Streptogan is thus used in elucidating body mechanisms in a manner similar to the use of bacterial endotoxins. Streptogan is also useful to potentiate relatively ineffective antibacterial agents, and especially antibiotics in order to provide greater activity or to enable the use of lower doses.

The ability of the product of the present invention to increase the resistance of a host to infection was shown in the following experiment. The product of the present invention was injected once daily for three days into the peritoneal cavity of male albino mice (18–20 gram weight). On the third day immediately after the third drug injection, the mice were infected with Staphylococcus aureus BX–1633–2 (a highly benzylpenicillin-resistant strain) using an intraperitoneal injection of a suspension of the cocci in five percent hog gastric mucin. Response is judged by survival or death of the mice. The results of the test were as follows:

| Product dose (mg./kg./day) three daily injections: | Response (ratio: deaths/total mice) |
|---|---|
| 100 | 0/5 |
| 0 | 10/10 |

Tests of this product did not show protective action when a single dose was given at the time of mouse infection. Tests made by reinfecting surviving mice in the experiments shown in the above table indicated that the protective action of the multiple dose treatment persisted for at least six days following drug injection.

The above procedure can also be used as an assay method for the product of the present invention.

Streptogan is a high-molecular weight glycoprotein and differs from the actinogan in the following respects: (1) the nature of the antitumor spectra; (2) failure of streptogan to yield an active protein on degradation with trichloroacetic acid comparable to peptogan obtained from actinogan under identical conditions; (3) different mobilities on electrophoresis of active protein-enriched fractions from actinogan and streptogan, obtained by chromatography on sulfoethyl cellulose; and (4) demonstration of different antigens by haemoglutination and gel diffusion (Oucherlony) tests.

While the foregoing invention has been described in terms of its preferred embodiment, those skilled in the art will appreciate that modifications can be made without departing from the spirit and scope of this invention.

What is claimed is:

1. The process of producing a new biologically active substance, identified as streptogan, which comprises cultivating *Streptomyces streptoganensis* A.T.C.C. No. 15421 under submerged aerobic conditions in an aqueous carbohydrate solution containing a nitrogenous nutrient until substantial activity versus Sarcoma 180 is produced in said medium.

2. The process according to claim 1 including the additional step of recovering the streptogan thus produced.

3. The process of claim 1 wherein the cultivation is carried out at a temperature of substantially from 20 to 35° C. and for about one to six days.

4. A new biologically active substance, identified as streptogan, which is prepared by the process of claim 1.

5. The product produced by first contacting an aqueous solution of the product of claim 4 with a cation exchange sulfoethyl cellulose and then elution of the material adsorbed thereon with phosphate buffer solution.

References Cited

UNITED STATES PATENTS

| 2,982,689 | 5/1961 | Donovick et al. | 167—65 |
| 3,072,531 | 1/1963 | Godtfredsen et al. | 167—65 |
| 3,097,137 | 7/1963 | Beer et al. | 167—65 |

ALBERT T. MEYERS, *Primary Examiner.*

JEROME D. GOLDBERG, *Assistant Examiner.*